(12) United States Patent
Pastor Perales et al.

(10) Patent No.: US 9,961,163 B2
(45) Date of Patent: May 1, 2018

(54) METHOD AND SYSTEM FOR NOTIFYING SUBSCRIBER DEVICES IN ISP NETWORKS

(71) Applicant: TELEFONICA, S.A., Madrid (ES)

(72) Inventors: Antonio Agustin Pastor Perales, Madrid (ES); German Martin Gomez, Madrid (ES); M Mar Garcia Puerto, Madrid (ES)

(73) Assignee: TELEFONICA, S.A., Madrid (ES)

( * ) Notice: Subject to any disclaimer, the term of this patent is extended or adjusted under 35 U.S.C. 154(b) by 400 days.

(21) Appl. No.: 14/584,305

(22) Filed: Dec. 29, 2014

(65) Prior Publication Data

US 2015/0189044 A1    Jul. 2, 2015

(30) Foreign Application Priority Data

Dec. 27, 2013    (EP) ..................................... 13382563

(51) Int. Cl.
| | |
|---|---|
| *G06F 15/16* | (2006.01) |
| *H04L 29/08* | (2006.01) |
| *H04L 29/06* | (2006.01) |

(52) U.S. Cl.
CPC ............ *H04L 67/32* (2013.01); *H04L 63/126* (2013.01); *H04L 67/24* (2013.01); *H04L 67/26* (2013.01); *H04L 67/30* (2013.01)

(58) Field of Classification Search
CPC ....... H04L 29/06; H04L 29/08; H04L 63/126; H04L 67/24; H04L 67/26; H04L 67/30; H04L 67/32; H04L 67/327
See application file for complete search history.

(56) References Cited

U.S. PATENT DOCUMENTS

| | | | | |
|---|---|---|---|---|
| 6,459,913 B2 * | 10/2002 | Cloutier | .................. | H04W 4/12 379/211.01 |
| 7,248,857 B1 * | 7/2007 | Richardson | ....... | H04M 3/42068 379/88.12 |

(Continued)

OTHER PUBLICATIONS

The Extended European search report issued by European Patent Office dated Feb. 27, 2014.

(Continued)

*Primary Examiner* — Suraj Joshi
*Assistant Examiner* — Ayele Woldemariam
(74) *Attorney, Agent, or Firm* — Michael B. Fein; Eckert Seamans Cherin & Mellott, LLC

(57) ABSTRACT

A system (111) and method for notifying subscriber devices (121) communicated with a subscriber local area network (120) and an ISP network operator (100) for receiving (101) notification requests comprises:
  a contact database (14) of subscriber devices (121) and notification mechanisms available for each subscriber device (121),
  a query manager (11) which consults the contact database (14) to verify the subscriber device (121) and its available notification mechanisms and sends a state of the notification request to the ISP network operator (100),
  a detector (13) for inventorying each subscriber device (121) in the contact database (14), analyzing (105) traffic from the subscriber local area network (120) and identifying notification mechanisms of each inventored subscriber device (121);
  a notifier (12) which selects (108) at least one notification mechanism from the available notification mechanisms for notifying the destination subscriber device (121) using the selected notification mechanism if any available.

6 Claims, 11 Drawing Sheets

(56) References Cited

U.S. PATENT DOCUMENTS

| | | | | |
|---|---|---|---|---|
| 2010/0199188 A1* | 8/2010 | Abu-Hakima | ...... | H04L 12/1895 709/224 |
| 2010/0312852 A1* | 12/2010 | Kamga | ............... | H04L 67/2823 709/217 |
| 2013/0046880 A1 | 2/2013 | Danzis et al. | | |
| 2013/0303228 A1* | 11/2013 | Sennett | ................... | H04W 4/22 455/521 |

OTHER PUBLICATIONS

J. Livingood et al., "Recommendations for the Remediation of Bots in ISP Networks; rfc6561.txt", Internet Engineering Task Force (IETF), Internet Society(ISOC), Mar. 20, 2012, pp. 1-29.

* cited by examiner

METHOD AND SYSTEM FOR NOTIFYING SUBSCRIBER DEVICES IN ISP NETWORKS

CROSS-REFERENCE TO RELATED APPLICATIONS

Benefit of European Patent Application No. 133825638, filed Dec. 27, 2013, is claimed.

FIELD OF THE INVENTION

The present invention has its application within the telecommunication sector, especially, relates to notifications mechanisms for subscribers of an Internet Service Provider (ISP).

BACKGROUND OF THE INVENTION

There are different mechanisms that can be used by an ISP to communicate with a subscriber/client/user. The following list identifies the most common existing solutions:
Online methods based on the ISP access network itself
  Notification to the Web browser. intercepting the HTTP traffic and injecting a banner or input page (splash page)
  Walled Garden notification, redirecting web browsing traffic to an ISP portal limiting access to only certain domains (ISP portal, antivirus download, etc.)
  Instant messaging
  Email
  TV Screen alert
  Social Media: Many social networks provide private and direct messaging to users that can be used for the notifications.
Offline methods (analog or digital methods, without a direct relation with the connectivity of the subscriber to the ISP)
  Phone call
  Postal mail
  Fax
  Short Message Service (SMS)
However, these existing notification techniques do not guarantee that notifications get to the user device and are seen by the user. More particularly:
  Email. It may be possible that the email address is not used by the subscriber, that it is classified as SPAM, etc.
  Phone call. For an ISP a phone call has limitations regarding suitable times and the subscriber availability.
  Postal mail. Postal mail notifications may take too long.
  Instant Messaging and Social Media. The lack of standardization of instant messaging solutions, and even solutions linked to network access types (mobile or fixed) increases complexity and reduces the capacity of sending a notification. Additionally, many instant messaging systems do not guarantee the delivery nor do they implement acknowledge mechanisms.
  Short Message Service (SMS). As with phone calls it has limitations in terms of acceptable times, and it also lacks mechanisms to confirm that messages are read (device errors, lack of space, no forwarding SMS services).
  Notification to the web browser. It is necessary that the client uses a standard web browser. Additionally, most browsers integrate complements to block publicity or for security matters, that could interfere with the notification mechanism.
  Walled Garden. These solutions can affect other devices in the home/business site impacting the service (emergency calls, monitoring, business disruption)

Moreover, some of these notification systems raise questions to the subscriber regarding the sender authenticity (email, phone calls) that reduce the notification success and require a second notification mechanism for the subscriber to validate the information. If the identity of the user device which the notification is sent to is not known, there can be problems to view the message (e.g. in small screens, incompatible browsers, etc.). Generally, the absence of intelligence and a measure of the reliability of the notification system reduce the reliability of any of these notification mechanisms themselves.

There are technologies to identify devices based on the network protocols used by them. For example:
  Fingerprinting: It is a procedure that enables the identification of a network device based on its communication stack. This mechanism identifies the operating system and applications from the analysis of the information flowing through the network. As its name suggests, it is based on getting a set of behavior patterns observed in the packets it generates in order to form a "finger print" that identifies it univocally. It uses signatures based on the values of headers fields present on network packets, and how these values are filled. Fingerprinting can be either passive if it only analyzes existing traffic or active if it sends traffic to the device to force it to generate traffic. In Active Fingerprinting, packets are sent to the device and its responses analyzed. In Passive Fingerprinting, packets sent by the device are analyzed by directly listening to the local network.

Other technologies exist that allow the remote identification of protocols and applications that are being used by a device:
  DPI (Deep Packet Inspection): This technology performs a complete packet inspection beyond its header. The goal of DPI is usually looking for protocols non-compliances to identify virus, spam, intrusions, etc., as well as statistical purposes. The analysis of network traffic by DPI is centered on the data and application portion of the packets circulating through the network, beyond the protocol header.
  IDS (Intrusion Detection System): It is a system that analyzes network traffic to discover attacks or intrusions indications.
  Network scanners: These programs trace all the ports of a device in order to discover which are open and which applications are listening. They are also able to get the applications versions and their possible vulnerabilities. A network scanner is implemented as a computer program that identifies network nodes, protocols and services. This information can be used to identify the device.

Additionally, many protocols include specific parameters that make it easier to identify the application type and version (User-Agent in HTML, Status Code in SMTP, etc.). There are also technologies that enable the connectivity between the ISP network and the user device located in the subscriber network:
  NAT (Network Address Translation): Real time mechanism that allows the subscriber's router to translate from the subscriber's network internal IPs to the public IP assigned by the ISP to the client.
  Port Forwarding: Mechanism that allows the redirection of a port in a network segment to another port. This technology makes it possible to establish a connection to a device in the internal network from the outside.

uPnP (Universal Plug and Play): Communication protocol family that allows network devices to dynamically discover the presence of other devices and establish a connection between them.

PCP (Port Control Protocol): Communication protocol, specified by RFC6887, which enables the communication with the network node that provides the NAT in order to open or redirect ports.

Web redirection: Also known as URL redirection, it is an HTTP protocol mechanism to indicate to an HTTP client to consult another URL or address when the client makes the first HTTP request. Status codes 30x implement redirection at the HTTP protocol level.

These different solutions, enabling the identification of user devices and their communication with the ISP network, have several problems to guarantee that the notifications get to the user device.

For example, the widespread use of private addressing, specified by RFC1918 and supported by NAT technologies to provide Internet access to subscribers, requires the shared use of public addressing between the subscriber's devices and even between subscribers, and makes it difficult the exact identification of the destiny of the notification. The exhaustion of IPv4 public addressing, making ISPs share available IPv4 between subscribers by an additional NAT application, makes it even more complex the subscriber and device identification from outside the subscriber's local network.

On the other hand, fingerprinting techniques, analyzing network traffic according to the device parameters related to network protocols such as DHCP, TCP, UDP, ICMP or IP, lose effectiveness and precision when used outside the network segment (LAN) where the user device is located, such as the ISP network or the Internet. In addition, latency times are parameters that allow the categorization of Operating Systems. The reception of notifications sent from outside the subscriber's local network used in some solutions needs additional network configurations to allow the traffic to get to the device, such as adapting NAT (port forwarding, uPnP, PCP, etc) or using Firewalls in the subscriber's CPE (Customer Premises Equipment). In this situation, the notification solution gets complicated since it involves the intermediate network devices and the security policies.

Other examples of Notification user systems are described below.

U.S. 2013/0046880 A1 defines a notification mechanism to an ISP subscriber base on web redirection. However, it does not guarantee traffic assiduity or the correct adaption to any device.

U.S. Pat. No. 6,459,913 B2 describes a unified alert system to a subscriber with different notification methods. However, it is exclusively based on a subscriber generated profile, i.e., it requires the subscriber to indicate which devices will be available, and its features, as well as the priority level, according to their preferences. This priority level needs not agree with the delivery reliability given it is a subjective subscriber judgment.

U.S. Pat. No. 7,243,130 B2 describes a notification selection method deducing the user interest and location based on information from multiple probes in usage context. Nevertheless, this method does not take into account the interest of the ISP for the information to get to the subscriber with maximum guarantee, which is not always according to the subscriber interest (e.g., the subscriber might not be interested in an alert due to violations of binding agreements with the ISP). In addition, the method disclosed in U.S. Pat. No. 7,243,130 B2 requires a previous configuration and inventory, being able to deduce, based on network traffic, which devices exist, and also needs a specific probe to be configured, since the attention level information is automatically obtained from the network.

Current solutions send notifications to the user blindly, that is, without the certainty that the notification is received or seen by the subscriber. Therefore, there is a need in the state of the art for a method and system to send notifications to a device inside the IP network of an Internet Service Provider's subscriber, selecting the protocol or mechanism that provides greater guarantees of being received or perceived by the user.

SUMMARY OF THE INVENTION

The present invention solves the aforementioned problems and overcomes previously explained state-of-art work limitations by disclosing a method and system which enables the identification of the type of subscriber's (user) device to be notified and select the optimum communication protocol in order to send a notification to said user device in the ISP network.

In a preferred embodiment, the present invention allows to determine a type of user device selected from computer, cell phone, Tablet, smartTV, etc., to name but a few, but also determines the Operating System Application running on the user device. In addition, this invention is able to discover whether the user device is active, either passively or in an active way (i.e., by injecting traffic in the subscriber's network segment).

The present invention selects and manages the best mechanism to send the notification to the determined user device based on the information circulating through the subscriber's network segment.

The proposed method and system for sending notifications to subscribers of the ISP is able to decide whether notifications are sent using the most reliable mechanism selected by the proposed method or sending notifications is delegated to the ISP network so that the ISP can use other offline channels, such as phone calls, postal mails, etc., if the proposed method considers it more reliable than the detected mechanisms.

In a possible embodiment of the invention, an Inventory of the different subscriber's devices is generated, associated with the best notification mechanisms for each of them.

A first aspect of the present invention refers to a method for sending notifications to subscribers of an ISP network, each subscriber having one or more devices connected to at least a subscriber local area network, which comprises the following steps:

receiving at least a notification request from an ISP network interface, the, at least one, notification request comprising a notification content and an identity of at least one destination subscriber device, analyzing the traffic from the subscriber local area network to discover subscriber devices and identify available notification mechanisms for each subscriber device, storing at least a contact address of each discovered subscriber device and its identified notification mechanisms, using the identity of the destination subscriber device, verifying the contact address of the destination subscriber device and whether there are any available notification mechanism for said destination subscriber device, if the contact address of the destination subscriber device is verified successfully and there is at least one available notification mechanism for the destination subscriber device, selecting at least one notification mechanism for sending the notification content to the contact address of the destination subscriber device;

sending also a response indicating a state of the notification request to the ISP network interface.

In a possible embodiment, if the contact address of the destination subscriber device is verified unsuccessfully, the proposed method verifies or checks periodically whether there are available notification mechanisms for the notification request, and if there are no available notification mechanisms after a time period (e.g., configurable by the network operator), the response of the notification request to the ISP network interface which is finally sent is indicating an error.

In another possible embodiment, if the contact address of the destination subscriber device is verified unsuccessfully but there are any available notification mechanism identified in a periodical checking, the method can send the notification content to all the discovered subscriber devices using any of the available notification mechanisms.

In a second aspect of the present invention, a system for sending messages of notifications or alerts to subscribers' devices, which is integrated in an IP network, is disclosed. The system has access to the subscriber's local network and communication with the ISP's management systems and comprises means for implementing the method described before, which are:

a contact database for storing contact addresses of subscriber devices and identifications of notification mechanisms available for each subscriber device, a query manager which verifies, performing a query in the contact database using the identity of the destination subscriber device, whether there are a contact address for the destination subscriber device and whether there are available notification mechanisms for the destination subscriber device; the query manager further comprises sending means for sending a response indicating a state of the notification request to a communication interface with the ISP network operator;

a detector comprising a discoverer which inventories each subscriber device in the contact database by listening to the subscriber local area network, an analyzer of traffic from the subscriber local area network and a creator for identifying notification mechanisms of each subscriber device inventored by the discoverer;

a notifier which selects one ore more notification mechanisms for the destination subscriber device from the available notification mechanisms, if there are any stored in the contact database from the ones identified by the creator, and the notifier further comprises means for sending the notification content to the contact address of the destination device using the selected notification mechanism.

This system comprises hardware and software components for managing alerts or notifications to the devices of an ISP subscriber, identifying the possible technological solutions available, analyzing the subscriber's local network traffic and selecting the most adequate delivery mechanism for the subscriber, the system dealing itself with the local delivery or delegating the task to external systems of the ISP.

A last aspect of the present invention refers to a computer program comprising computer program code means adapted to perform the steps of the described method, when said program is run on a computer, a digital signal processor, a field-programmable gate array, an application-specific integrated circuit, a micro-processor, a micro-controller, or any other form of programmable hardware.

The method in accordance with the above described aspects of the invention has a number of advantages with respect to prior art, which can be summarized as follows:

Reliability Is increased in the delivery of notifications, since the present invention guarantees the use of a media/protocol that is regularly used by the device.

Flexibility to adapt to the different technical solutions.

Intelligence to self-inventory the notification mechanisms and establish priorities.

Uses the real traffic from the subscriber's device in the decision algorithm in order to select the best notification delivery mechanism.

Efficiency of using only the adequate mechanism, instead of several simultaneous technologies (e.g. phone call plus postal mail).

Operator savings as more expensive notification mechanisms are substituted for lower cost methods.

These and other advantages will be apparent in the light of the detailed description of the invention.

DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

PREFERRED EMBODIMENT OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-11.

Figure 1:
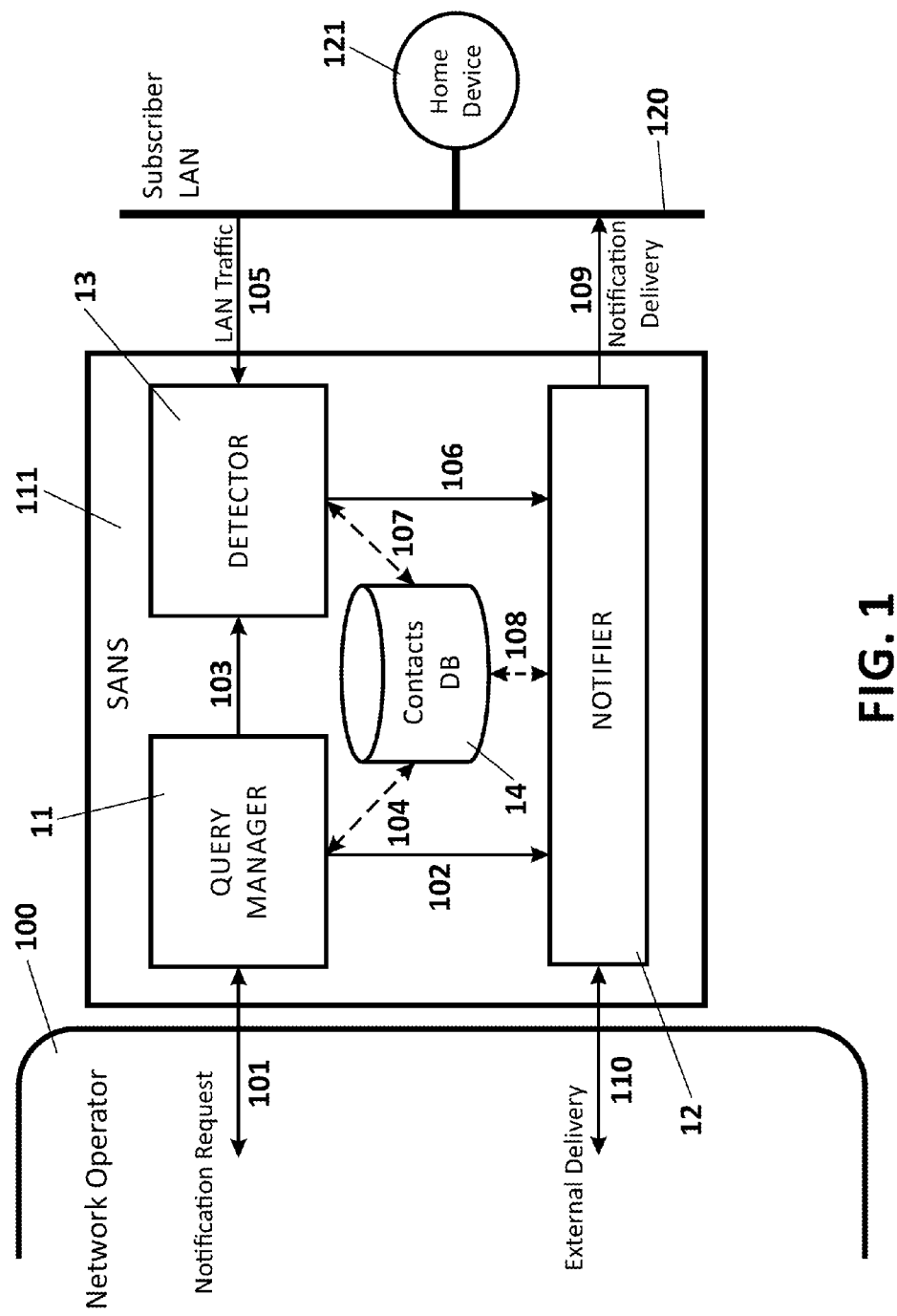
FIG. 1 shows a block diagram of a system for sending notifications to subscriber devices in an ISP network, according to a preferred embodiment of the invention.

FIG. 1 presents a block diagram of the system architecture implementing the proposed notification to ISP subscribers, including its main components and the interaction between them. The system (111) is integrated in an ISP network and comprises means for communicating with the ISP network operator (100) and with the local area network (120) which the subscriber's network devices (121) are connected. The proposed system (111) further comprises the following components:

- Query manager (11): It receives and distributes the notification requests (101) from the network operator (100). It searches (104) in a contact database (14) whether there are available contacts for the device (121) or devices of a subscriber and, if so, it informs (102) the notifier (12); otherwise, it asks the detector (13) for an active search (103). Finally, it supervises and informs the ISP about the state and notification process.
- Contact database (14): It is a repository that stores information on how to contact a device (121), the available mechanisms, and the priorities and reliability of each mechanism.
- Detector (13): It inventories the subscriber's network devices (121) and identifies the available mechanisms (107) in the contact database (14) in order to notify alerts to the device based on the analysis of the traffic (105) from the subscriber's local area network (120). Finally, it assigns priorities (106) to each notification mechanism, based on the analyzed network traffic and the tests performed by specific components of the detector (13) described below.
- Notifier (12): It selects (108) from the available mechanisms stored in the contact database (14), one or more mechanisms with higher priority, i.e., with higher probability to be seen by the user, issues the notification (109, 110), either locally, i.e., sending the alert directly (109) to the local area network (120) by altering the user traffic to notify the alert with no need of local agents in the device (121), or when it is not possible or efficient, it informs a network external system (110) with an adequate identifier to perform the notification. Lastly, it keeps the state of the notification process.

Figure 2:
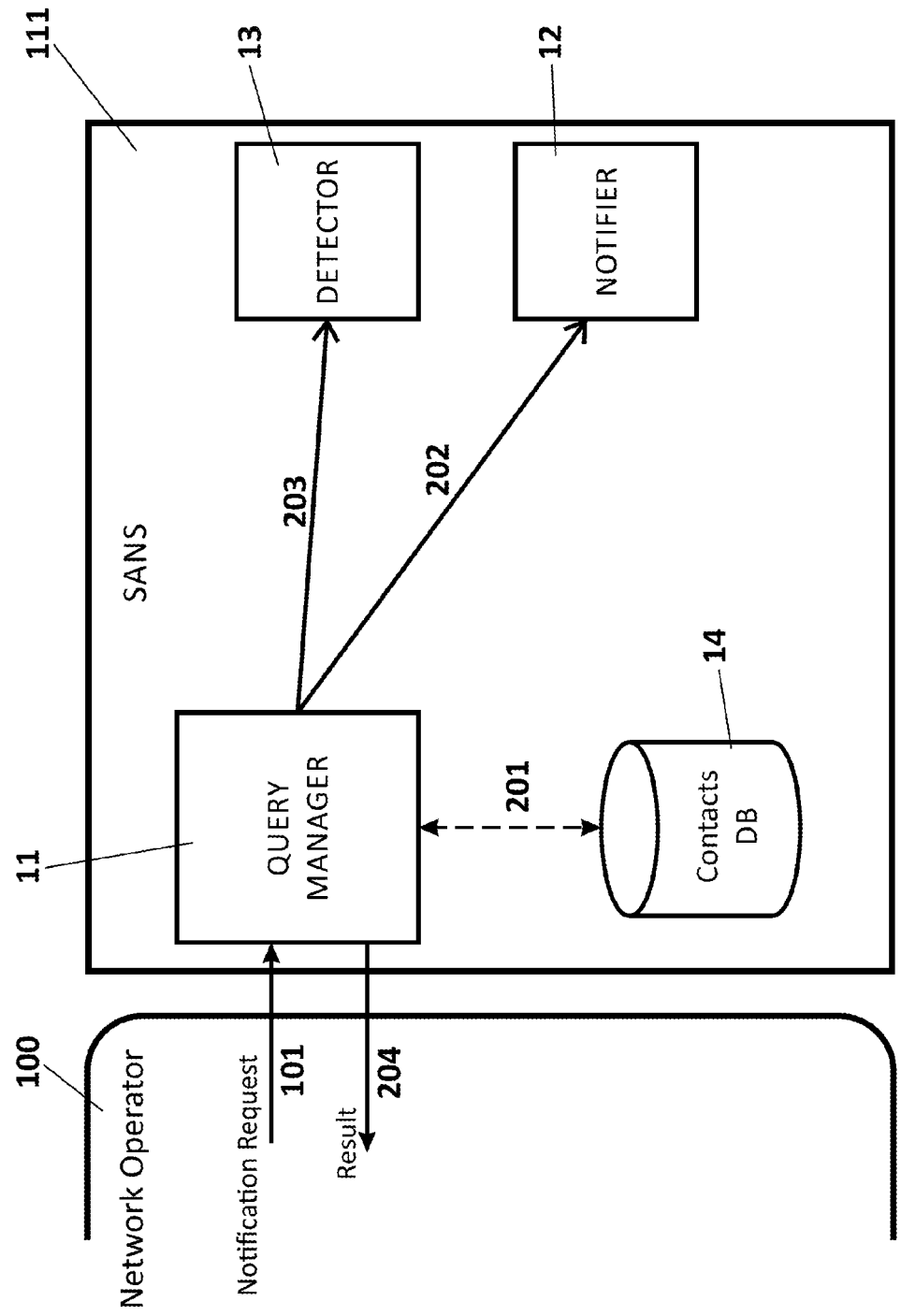
FIG. 2 shows a block diagram of communication flow between a query manager and the remaining components of the previous system, according to a preferred embodiment of the invention.

FIG. 2 shows in more detail the query manager (11) and its communication flow with the remaining components of the system (111). The query manager (11) is the entry point of the system (111) since it receives notification requests (101) from the network operator (100) to deliver a notification or alert message. These requests include the message content to be notified and the device or devices to which the message is destinated, and optionally, comprises additional parameters such as the priority level, activation and deactivation time, number of attempts and maximum waiting time. The destination device (121) can be identified by its IP address, the MAC Address, or hostname, and this identification of the device provides connectivity in the subcriber's local area network (120). The device identification is used to consult (201) the contact database (14) that stores the notification capacities to verify the existence of the destination device (121) and the valid notification mechanisms. The query manager (11) sends (202) the notification request with the information retrieved from the contact database (14) and according to the parameters conditionings to the notifier (12), only if it has found at least one available notification mechanism for the destination device (121). If a device is not specified in the notification request, there is the possibility to notify to all the devices identified and found in the contact database (14). In case there is no device resulting from the query to the contact database (14), the notification request progresses or is relayed (203) to the detector (13) to start an active search of the device or devices. Periodically, the query manager (11) consults the contact database (14) to check the existence of new available notification mechanisms for the request or the state of the notification to the device, and according to the result or errors, such as the impossibility of the detector (13) to obtain a notification mechanism, the query manager (11) generates a response (204) of the system (111) to the Network Operator (100), the response (204) comprising respectively the available notification mechanisms, if any, associated with the destination device(s), or an error report, if any.

Figure 3:
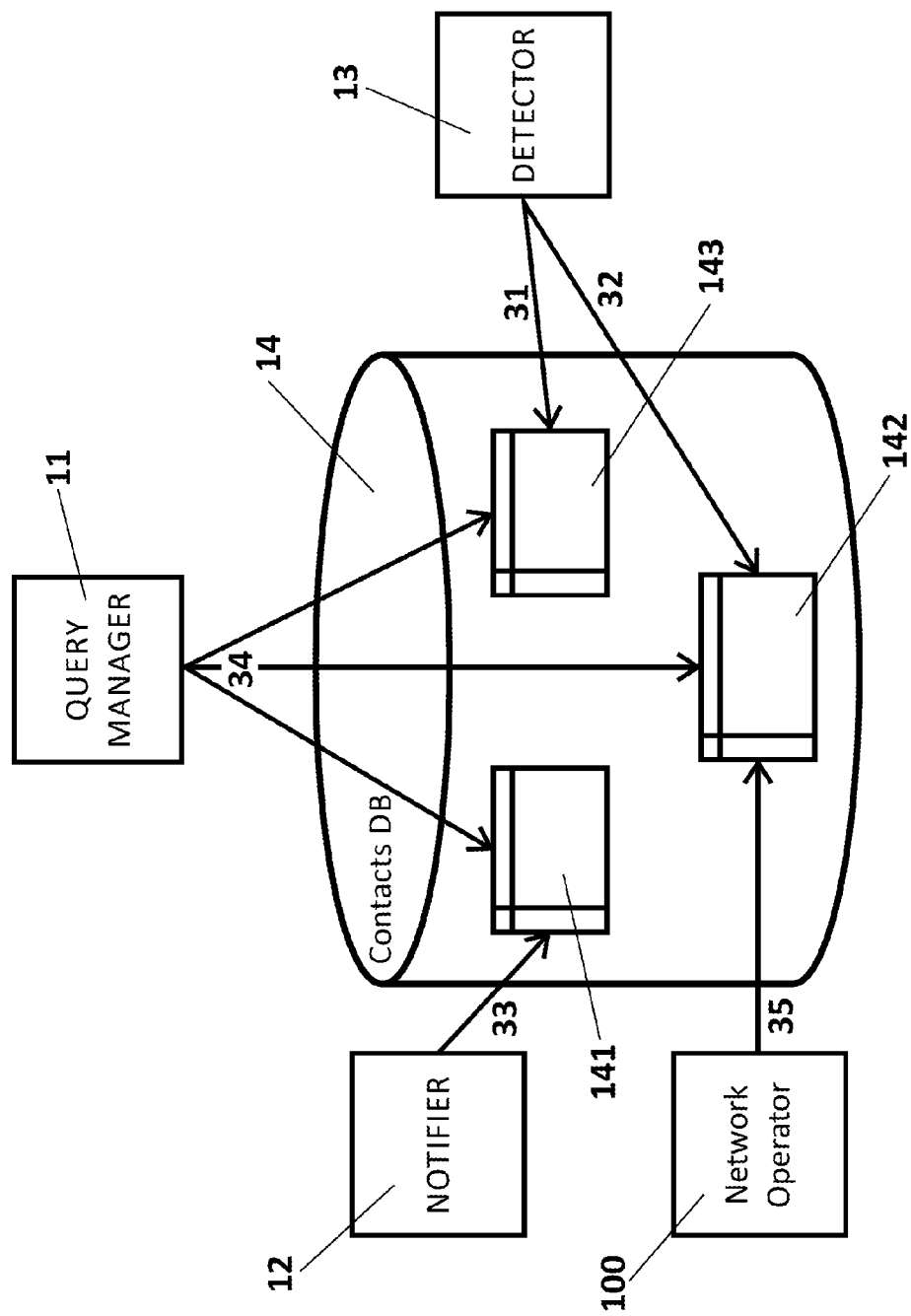
FIG. 3 shows a block diagram of communication flow between a contact database and the remaining components of the previous system, according to a preferred embodiment of the invention.

FIG. 3 shows in more detail the contact database (14) and its communication flow with the remaining components of the system (111). The contact database (14) implements the storage of all the necessary information for the operation of the system (111). The information stored mainly comprises:

- Notification processes state (141) so that the running notification processes can be consulted, with information about their state and result.
- Device inventory (142), which is a dynamic inventory of the subscriber's devices (121) in the subcriber's local area network (120), enriched with information received from the detector (13), which includes the device's features, e.g., the screen size, operating systems, available network protocols, applications with details about traffic volume and use frequency.
- Available notification mechanisms data (143), which include, for each device, details about the transport protocol to use and the reliability value of the mechanism obtained by the detector (13). In case a notification mechanism is not available for the device, the reliability value is set to null for indicating that said notification mechanism cannot be used.

This contact database (14) interacts with the rest of the system (111) as follows: The Contact database (14) receives (31) available notification mechanisms data (143) regarding the notification mechanisms discovered by the detector (13) as well as information (32) from the device inventory (142) as the subscriber's devices (121) are discovered by the detector (13). The Notifier (12) informs (33), updating the Notification processes state (141), about the internal notification process in the subcriber's local area network (120) or its delegation in order to the keep the external systems of the Network Operator (100) informed about the internal operation of the system (111). The query manager (11) consults (34) the availability of devices and notification mechanisms for each request it receives and, periodically, consults the state of the notifications to inform the Network Operator (100) on the result. Finally, the contact database (14) receives information from the Network Operator (100) to enrich with network data (35) from the subscriber's local area network (120) not accessible to the detector (13), and information on the offline notification mechanism supported by the Network Operator (100) together with its reliability degree.

Figure 4:
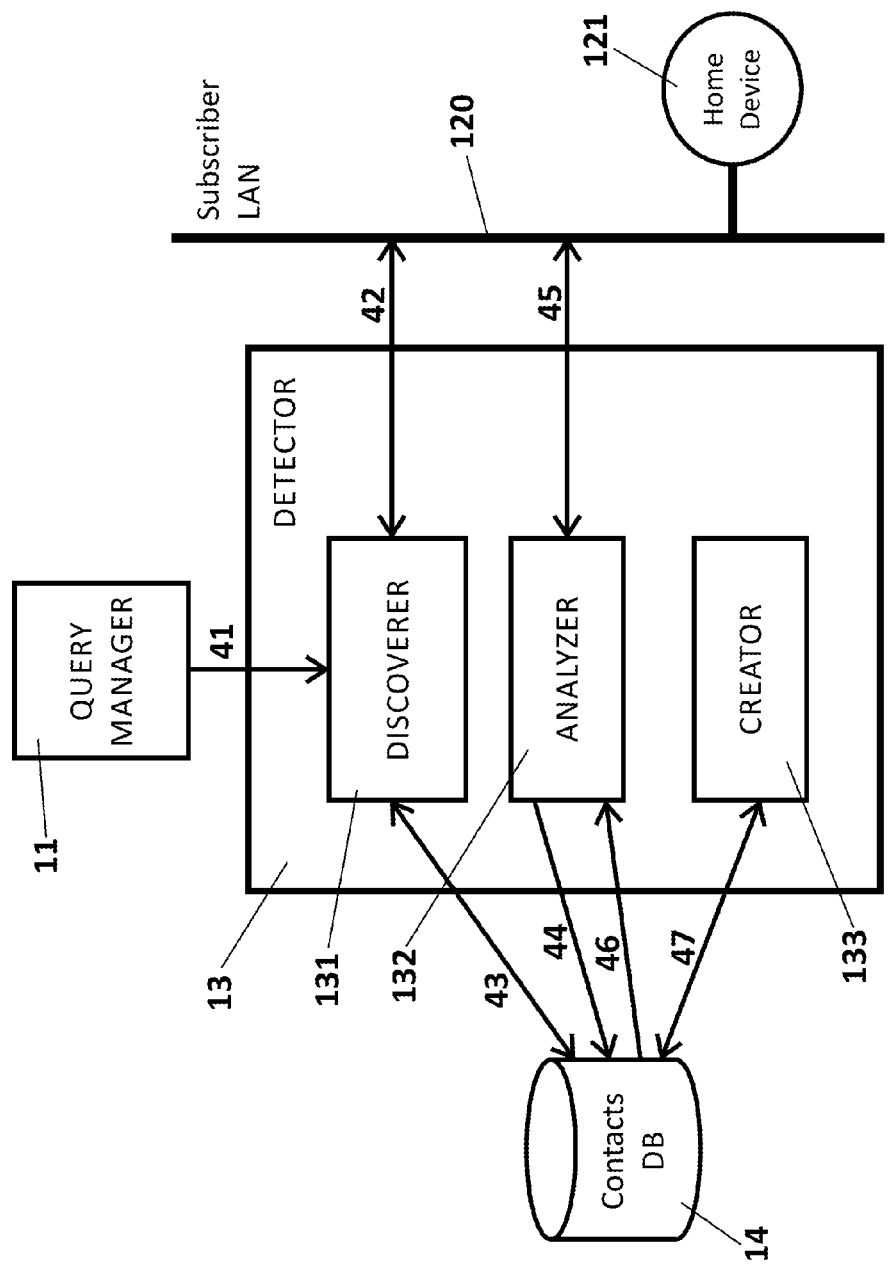
FIG. 4 shows a block diagram of communication flow between the components of a device detector in the previous system and the remaining components of this system, according to a preferred embodiment of the invention.

FIG. 4 shows in more detail the detector (13) of the system (111) and its components, interacting with the remaining components of the system (111). The detector (13) comprises the following components:

Discoverer (131): This component listens to the traffic in the wired or wireless subcriber's local area network (120) and inventories in the Contact database (14) all new subscriber's devices (121) that are connected. It also starts the search of a device on request, and verifies the reachability and state: online/offline. To that end, it relies on passive technologies (use of promiscuous mode in the wired network interfaces or monitor mode in wireless network interfaces, broadcast and multicast traffic, used by many devices to join the network), and active technologies (such as Address Resolution Protocol—ARP—or Neighbor Discovery—ND—traffic injection).

Analyzer (132): Its purpose is characterizing all new subscriber's devices (121) previously detected by the Discoverer (131). This component runs several tests in parallel, selecting useful information and storing it in the Contact database (14). This characterization includes multiple parameters such as the type of device, e.g., PC, cell phone, smartTV, tablet, etc., operating system and version, active network protocols, and running applications among others. The technology used is based in the combination of several techniques, each of which is part of the state of the art and not the subject of this invention, which are, for instance:

Network scan: Ports location, open protocols in the subscriber's devices (121).

Passive fingerprinting (listening to traffic in different protocols) and active fingerprinting (sending specific traffic) so that, depending on the parameters of traffic packets, a signature identifying the operating system and its version is obtained.

Vulnerabilities scanning: Tests about open protocols in order to identify vulnerable device versions and exploit them to obtain more information about the device.

Deep Packet Inspection (DPI): The Analyzer (132) is configured between the device and the network Gateway to view all the traffic of a device. This configuration can be run by the ISP remotely acting on the network equipment, or even using man-in-the-middle—MITM—techniques by the Analyzer (132) itself since it is connected to the network segment. This technology provides details about the type and version of the applications used in some protocols, improving characterization.

Thus, the Analyzer (132) combines these tools to extract information concerning notification solutions exclusively which is relevant for an ISP Network Operator (100). Additionally, the Analyzer (132) collects statistical information related to two parameters: traffic volume generated by every application over time and frequency of use of every application, estimated from the traffic observed in applications. This statistical information collected by the Analyzer (132) is used by the next component, the Creator (133), to predict reliability degrees of the available notification mechanisms.

Creator (133): This component identifies the notification mechanisms that the ISP Network Operator (100) can use with each device and decides the value/degree of reliability of each of them. As long as this component cannot establish the confidence for a specific device notification method, such notification method cannot be used.

The detector (13) continually analyzes the network traffic to identify and classify the available notification mechanisms, so that the information is at the disposal of the remaining components of the system (111) with which the detector (13) interacts as shown in FIG. 4. The process performed by the detector (13) is fired when the query manager (11) requests a search (41) for a notification mechanism to a specific subscriber's device (121) that is unknown or when the Discoverer (131) discovers a new subscriber's device (121) while listening to traffic (42) in the subcriber's local area network (120). The information regarding the device identification and reachability state is periodically updated (43) into the Contact database (14). The Analyzer (132) periodically consults (44) the Contact database (14) in order to know the discovered subscriber's devices (121) and, for the available notification mechanisms assigned to the new subscriber's devices (121) in the Contact database (14), the Analyzer (132) collects statistical information (45) from the subcriber's local area network (120). In turn, the Analyzer (132) stores (46) this statistical information and the characterization data of the subscriber's devices (121) into the Contact database (14) so that the Creator (133) can use all this information. Finally, the Creator (133) is responsible for reading the information that is available about a subscriber's device (121) from the Contact database (14) and assigning (47) the notification mechanisms and their reliability degree to each subscriber's device (121).

Figure 5:
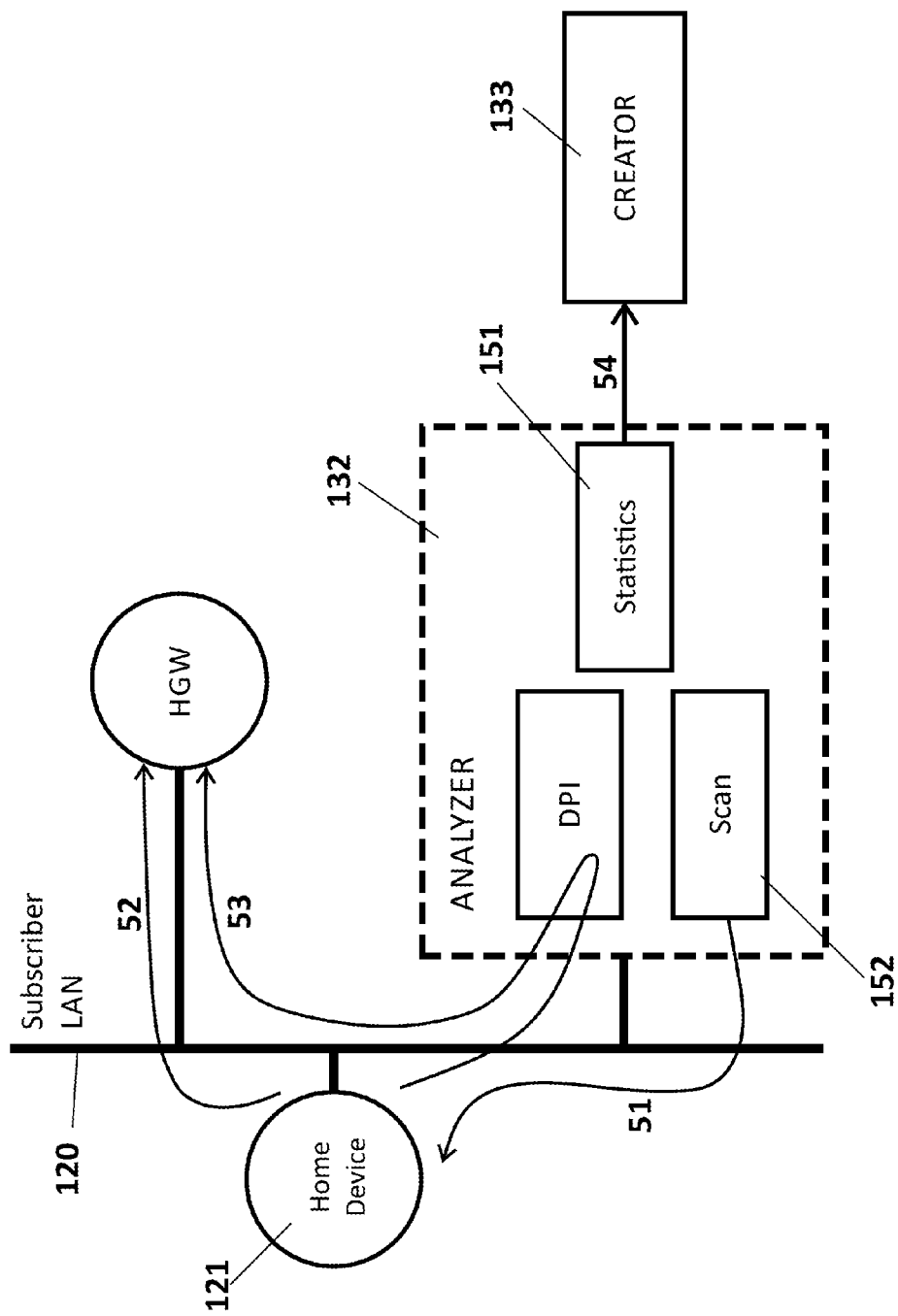
FIG. 5 shows a block diagram of an analyzer component of the device detector and communication flow between other remaining components of this device detector, according to a preferred embodiment of the invention.

FIG. 5 shows how the Analyzer (132) works and interacts with the Creator (133). The Analyzer (132) uses network scanning (51), not affecting the user normal traffic (52) to the Home Gateway (HGW). For a more complete analysis, the traffic is forwarded (53) through the Analyzer (132) after performing a Deep Packet Inspection (DPI). Lastly, statistical information (151) is generated, from the traffic scanned (152) and observed through the Deep Packet Inspection (DPI), and delivered (54) to the Creator (133) so that it can estimate the reliability of the notification mechanisms.

Figure 6:
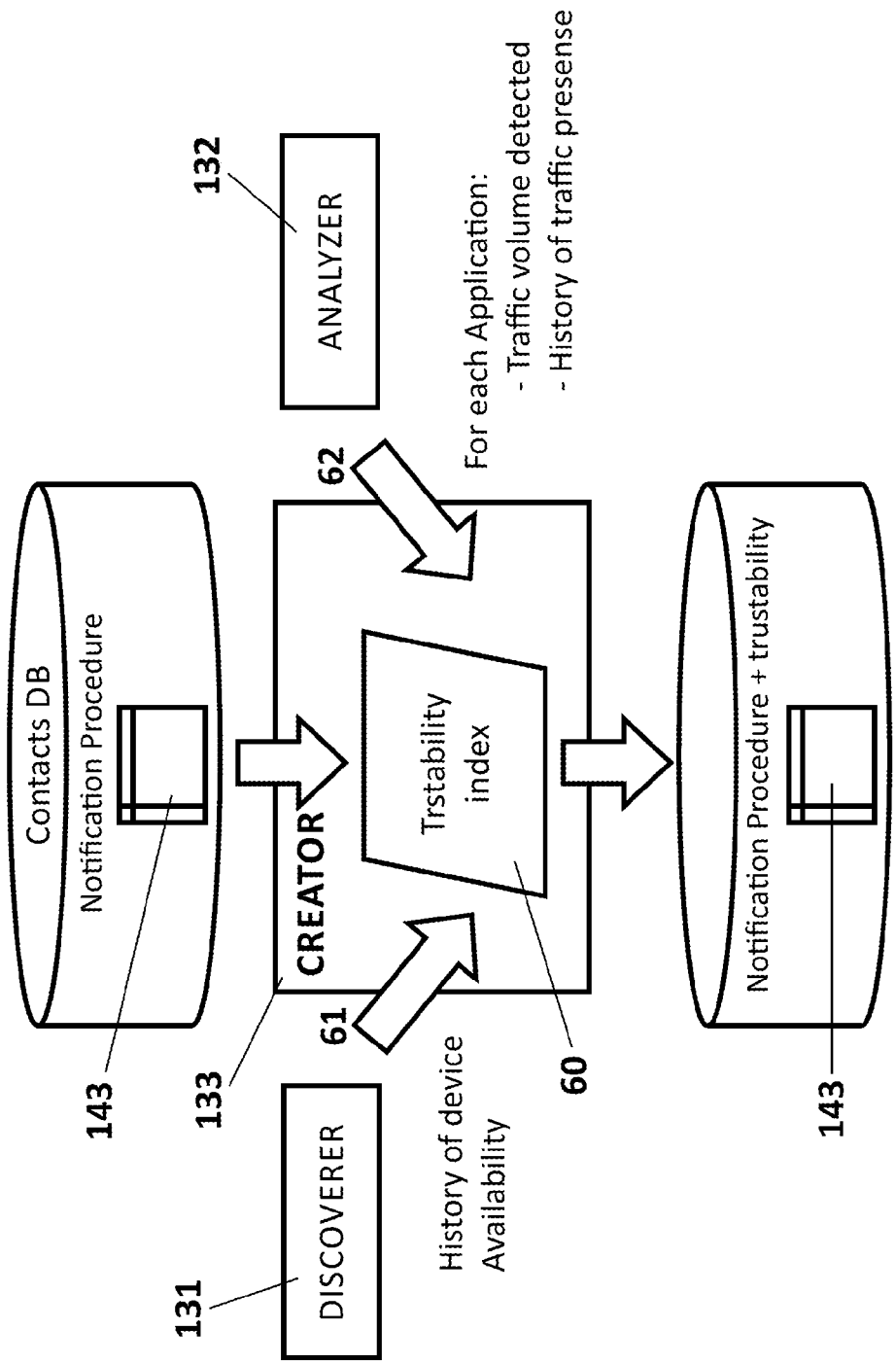
FIG. 6 shows a block diagram of a creator component of the device detector and communication flow between other remaining components of this device detector, according to a preferred embodiment of the invention.

FIG. 6 shows how the Creator (133) works and interacts with the other components of the detector (13) and the Contact database (14). The Creator (133) estimates a reliability value or trustability index (60) by combining data regarding availability of the discovered devices (61) by the discoverer (131), frequency and traffic volume (62) for the notification mechanisms that have been identified by the analyzer (132). This trustability index (60) is included in the notification mechanisms data (143) associated with the available notification mechanisms stored in the Contact database (14).

Figure 7:
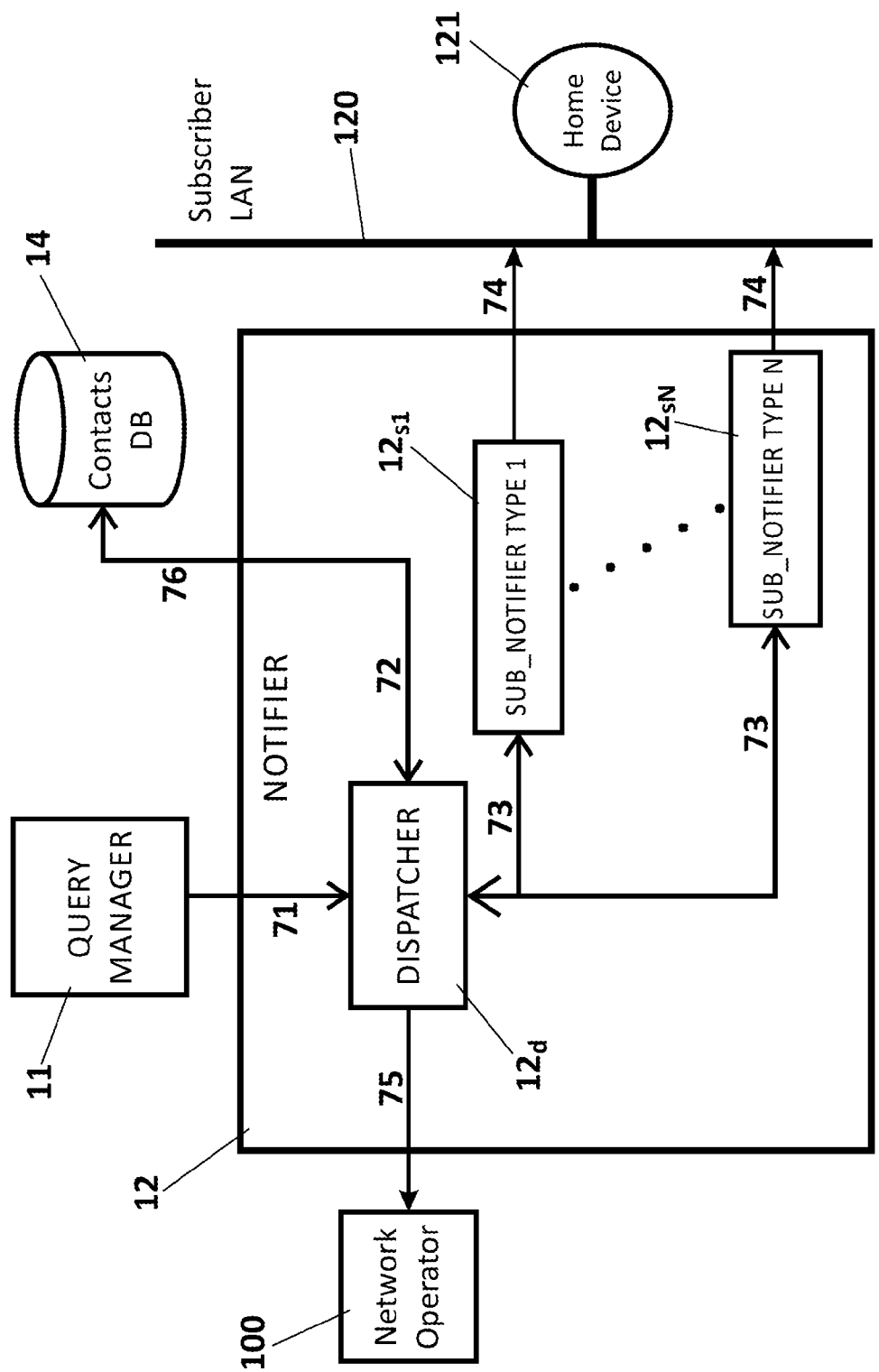
FIG. 7 shows a block diagram of communication flow between the components of a notifier in the previous system and the remaining components of this system, according to a preferred embodiment of the invention.

FIG. 7 shows in more detail the notifier (12) of the system (111) and its components, interacting with the remaining components of the system (111). The notifier (12) comprises the following components:

Dispatcher ($12_d$): it receives and distributes requests to the adequate notification components according to the technological availability detected in the network and the priority values that have been determined.

Sub_notifiers ($12_{s1}, \ldots, 12_{sN}$): These components implement the notification technologies. Each component is exclusively dedicated to a technology, such as HTTP frames injection or sending text through instant messaging. The notification mechanisms that these components implement are part of the state of the art and are not the subject of this invention, and as such are not described here The notifier (12) comes into action when at least a subscriber's device (121) and a viable notification mechanism for this device have been identified. Then, the notifier (12) is activated (71) by the query manager (11) when the Contact database (14) has information about the identified subscriber's device (121) and at least an available notification mechanism. The Dispatcher ($12_d$) consults (72) the Contact database (14) to recover the notification mechanisms that are available and select the one or those ones with a priority value higher than a threshold confirable by the network operator (100). The Dispatcher ($12_d$) sends (73) all the necessary information for the notification to one or more of the Sub_notifiers ($12_{s1}, \ldots, 12_{sN}$), which in turn deliver (74) the notification message to the subscriber's device (121) or devices involved. Each of the Sub_notifiers ($12_{s1}, \ldots, 12_{sN}$) further notifies (75) the result of the sending process, and in some cases, depending on the technology used, can send back an acknowledgment of the notification reception to the network operator (100). With all the previous information used, the Dispatcher ($12_d$) updates (76) the information in the Contact database (14), so that the updated information is available to the rest of modules of the system (111).

Figure 8:
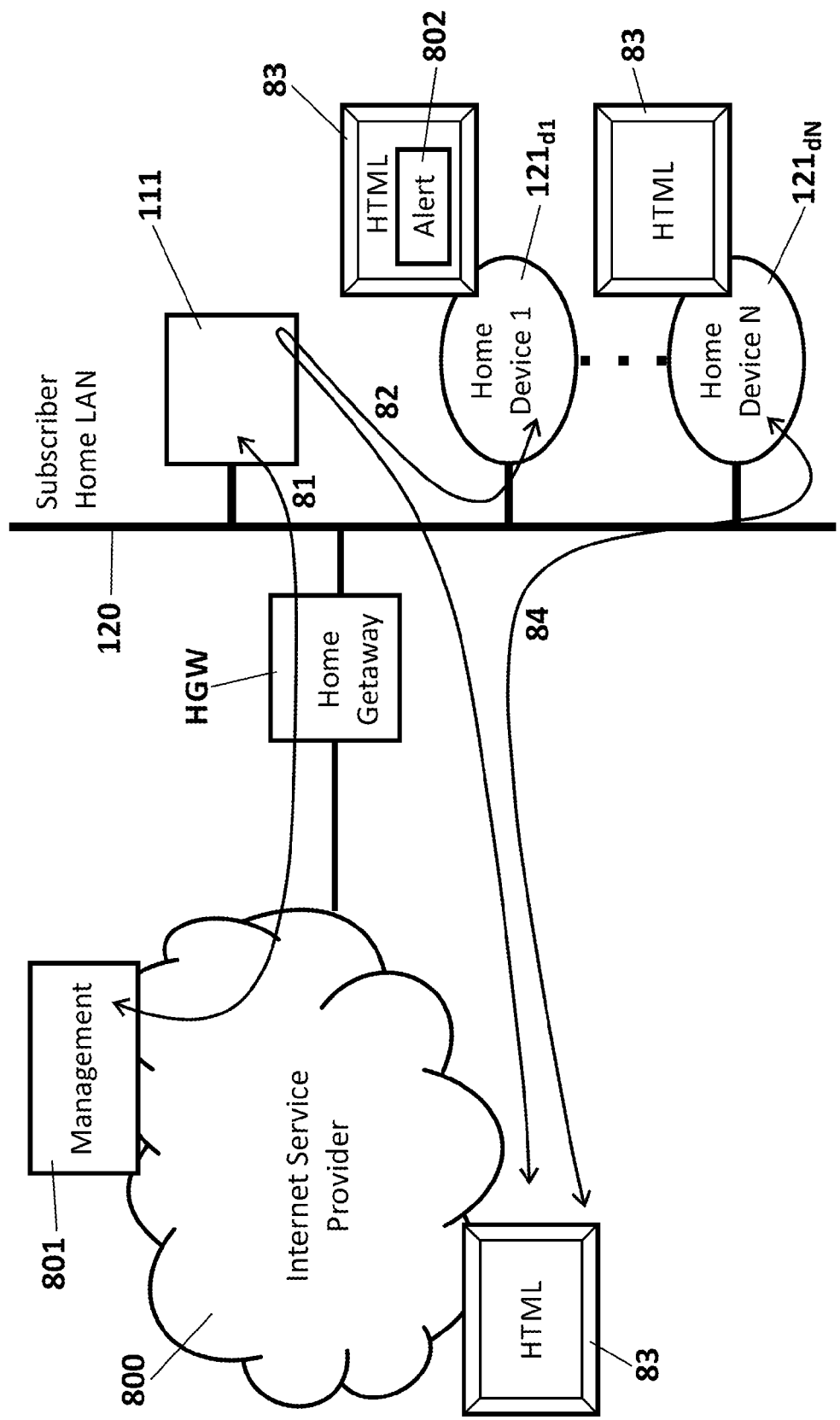
FIG. 8 shows a network scenario for application of the system sending alert notifications to subscriber devices in an ISP network, according to a possible use case of the invention.

FIG. 8 shows a use case example of network scenario in which the system (111) can be integrated in the subscriber's local area network (120) to apply the described method for sending notification or alert messages to one or more home devices ($121_{d1}, \ldots, 121_{dN}$) connected to a home LAN network, which is the local area network (120) with which a subscriber of an ISP network (800) is communicated. The local area network (120) and the ISP network (800) are communicated through a home gateway (HGW). The system (111) for notification of a message, as an alert, is provided by the ISP as a HW device located in the local area network (120) and is managed by the ISP through a management module (801) and the subscriber's network connectivity with the home gateway (HGW). The system (111) provides the network operator (100) of the ISP network (800) with means for notification of alerts to a subscriber that has to be conscious of the alert in order to authorize the network operator (100) to take certain actions, or for the subscriber to take measures in relation to the notified subscriber's devices ($121_{d1}, \ldots, 121_{dN}$). Some use cases related to security alerts are warnings of improper use of the network such as SPAM generation or a warning about a device infected by malware. The system (111) receives a request to notify a security alert (81), e.g. an malware infection, to at least one of the subscriber's devices ($121_{d1}, \ldots, 121_{dN}$), e.g., a first subscriber's device ($121_{d1}$) is the one specified to be given the alert in FIG. 8. The system (111) receives the notification request from the management module (801) of the ISP network (800) through the home gateway (HGW) and executes the method described before: locating the device, identifying the available mechanisms (e.g. a frame injection in a HTTP page used by the device, a SMS, and an active email account obtained analyzing online traffic), and selecting the most reliable mechanism (injecting an HTTP banner is estimated as the most reliable mechanism), finally launching (82) the notification alert by redirecting and injecting an HTML message (83) comprising the alert information (802). In the case that the rest of the of the subscriber's devices ($121_{d1}, \ldots, 121_{dN}$) are not requested to be notified, in the example, since they are not affected by malware, no notification mechanism is activated (84).

The system (111) described here is not restricted to notification mechanisms for security alerts, since the present invention admits notifications of any nature, for example:

Quota consumption of a pay-per-use service.

Advertising directed to a device by the Operator

Figure 9:
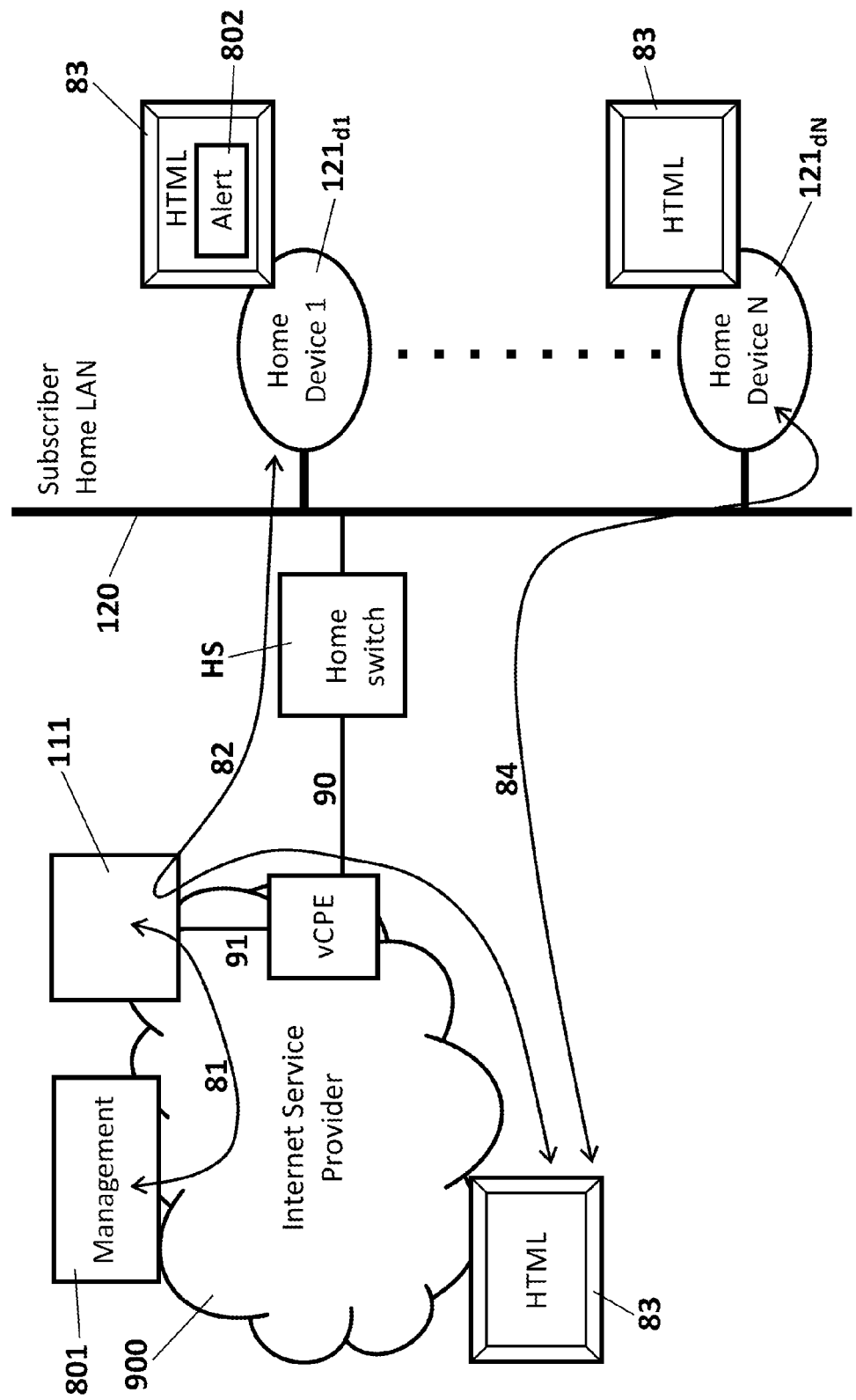
FIG. 9 shows a network scenario of Virtual Customer Premises Equipment in the ISP network for application of the system sending alert notifications to subscriber devices, according to another possible use case of the invention.

FIG. 9 shows an alternative use case example of network scenario in which the system (111) can be integrated using a virtualization capacity, that is, with access to a virtualized broadband HGW (vCPE) so that the traffic at the OSI 3 level is directly accessible (91) by the network operator (100). In this case, the system (111) is located in the ISP network (900) within a Software Execution Virtual Environment as the one disclosed in ES 2386048 B1. The Software Execution Virtual Environment provides a shared operator network equipment (e.g. virtualized server resources) that is logically connected to the Aggregation Bridge instance offered by vCPE so that it has Layer 2 connectivity with home devices and with the user facing interface of the virtual Home Router. In this Software Execution Virtual Environment, the system (111) for alert notification works following the same steps shown in FIG. 8 but also using the layer 2 connectivity (91) of the broadband Home Gateway (vCPE) connected (90) to a home switch (HS).

Figure 10:
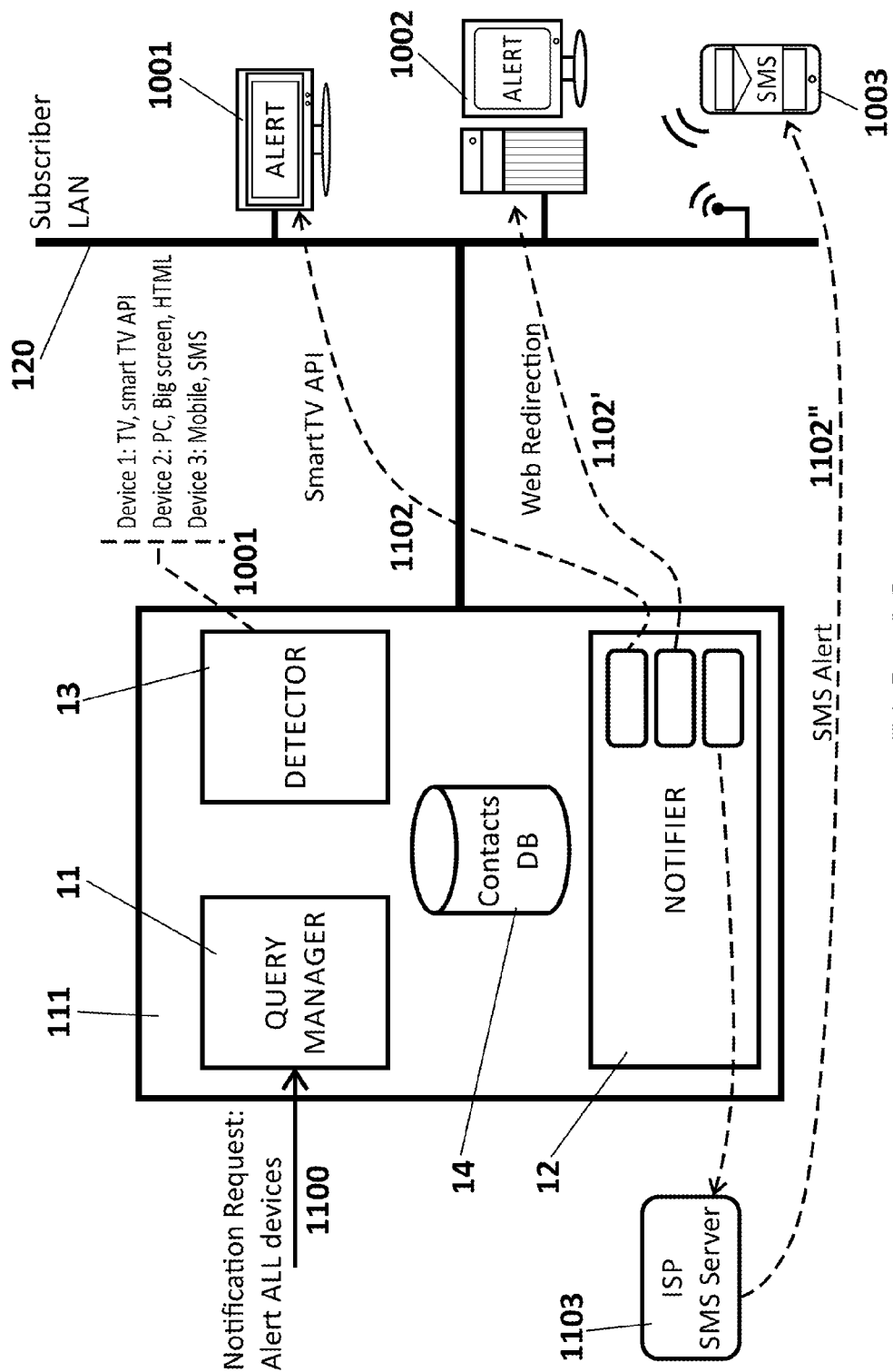
FIG. 10 shows a network scenario with different types of subscriber devices for application of the system sending different alert notifications to each type of subscriber device, according to a further possible use case of the invention.

FIG. 10 shows a further example of use case where the capacity of system (111) is used to detect a type of subscriber's device (1001, 1002, 1003). The system (111) has the capacity to identify through the detector (13) that the subscriber's home has several types of devices (1001, 1002, 1003) and multiple notification options assigned to them. For example, in a possible network scenario as shown in FIG. 10, the network operator (100) requests sending a massive alert (1100) to all the subscriber's devices (1001, 1002, 1003) connected to the subscriber's local area network (120). The detector (13) can identify the different types of devices (1001, 1002, 1003) and notification mechanisms (1101), e.g.: a smart TV (1001), a desktop computer (1002) and a cell phone (1003). The notifier (12) generates a notification message adapted respectively to each device (1102, 1102', 1102"). For example, the smart TV (1001) offers an API (1102) to show messages on the screen, the desktop computer (1002) is used for web browsing (1102') and, therefore, a web redirection can be used to show an HTTP message, and the use of an SMS server (1103) of the ISP to send SMS alerts (1102") allows phone cells (1003) with 2G technology to be reached. This implementation can simplify the ISP management, since messages are independent of the type of device, delegating on the SAS the intelligent adaption of messages so that there is a higher probability and hence reliability on the alerting being observed.

Figure 11:
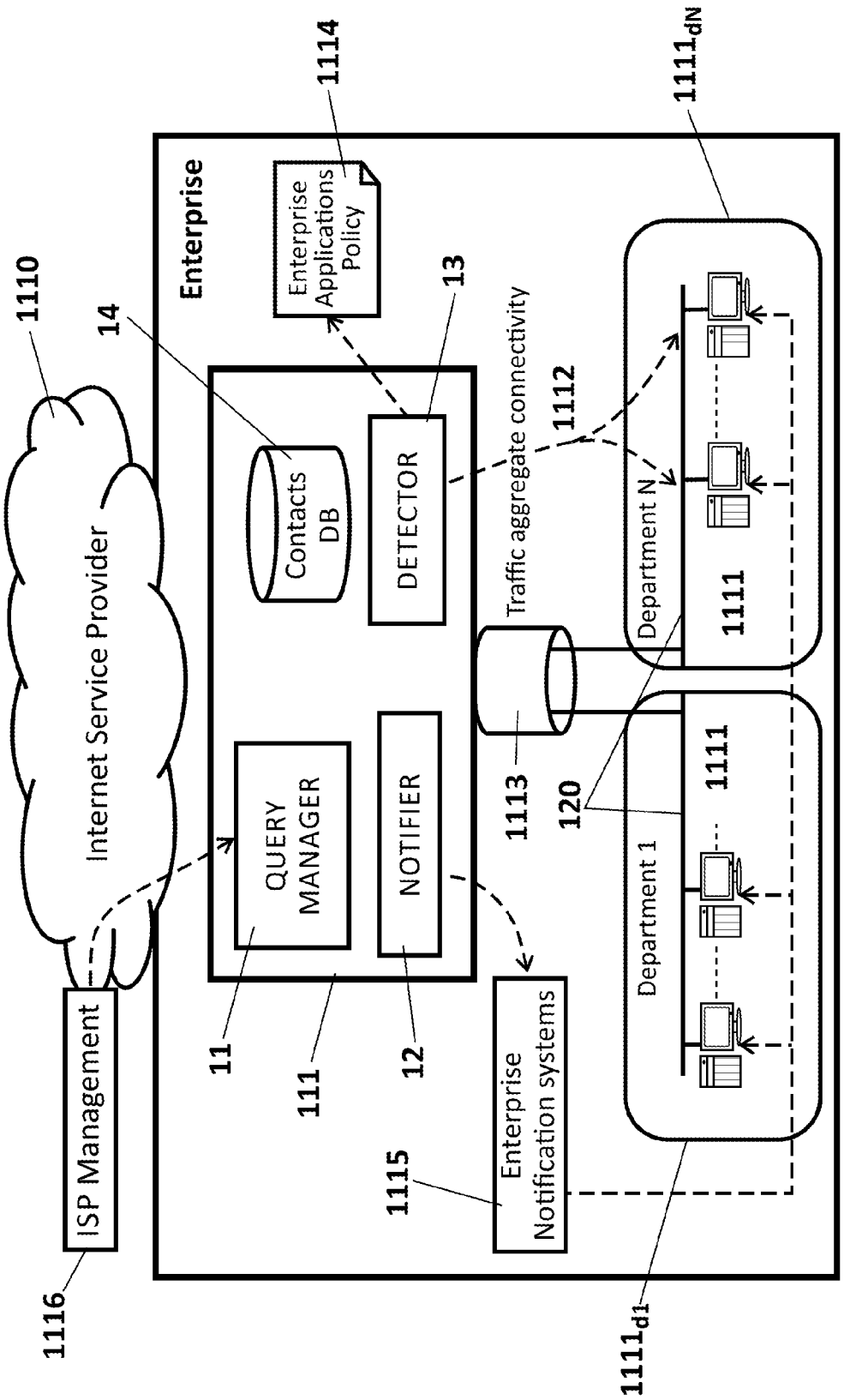
FIG. 11 shows a network scenario of an enterprise for application of the system sending notification messages to the subscribers, according to a further possible use case of the invention.

FIG. 11 shows an applied use case where the system (111) is an extension to a business environment with multiple LANs ($1111_{d1}$, $1111_{dN}$) to which the users are connected with a high number of devices (1111), worsen by the BYOD phenomenon: Bring-Your-Own-Device. The technical efficiency of the system (111) can be understood thanks to the detector (13) that can supervise the intranet traffic (1112) to detect and inventory a high number of devices (1111). The arrangement of the system (111) in the intranet connected to the traffic (1113) of different enterprise subnets or LANs ($1111_{d1}$, . . . , $1111_{dN}$), by means of VLANs aggregation technologies or 802.1Q, or the deployment of physical interfaces in each subnetwork, allows to optimize the notifications with a small number of hardware resources. Additionally, the detector (13), as part of the process of identifying the mechanism with more reliability, makes it possible to classify the use and volume of traffic in the enterprise network and detect applications not conforming to the enterprise policy (1114). As part of the notification mechanisms, the notifier (12) can optionally be extended making use of additional notification mechanisms (1115) which are available in the enterprise, such as email lists, electronic boards, client applications at the elements, etc. to avoid duplicities and optimizing resources thanks to the centralized management (1116) of the query manager (11) by the ISP network operator (1110).

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for notifying subscriber devices connected to a subscriber local area network in internet service provider (ISP) networks, the method comprising:
   receiving at least one a notification request from an ISP network interface, the, at least one, notification request comprising a notification content and an identity of at least one destination subscriber device, further comprising:
   analyzing network traffic from the subscriber local area network to discover subscriber devices and identifying notification mechanisms of the discovered subscriber devices connected to the subscriber local area network,
   assigning a priority to each of the identified notification mechanisms based on the analyzed network traffic;
   storing a contact address of each of the discovered subscriber devices and the identified notification mechanisms for each of the discovered subscriber devices and priorities and reliabilities of each of the identified notification mechanisms;
   verifying using the identity of the destination subscriber device a contact address of the destination subscriber device and whether notification mechanisms for the destination subscriber device are available,
   when the contact address of the destination subscriber device is verified successfully and the notification mechanisms for the destination subscriber device are available, selecting at least one notification mechanism from the available notification mechanisms and sending the notification content to the contact address of the destination subscriber device using the selected notification mechanism
   wherein a notifier module generates a notification message adapted respectfully to each of the discovered subscriber devices;
   sending a response indicating a state of the notification request to the ISP network interface; and
   wherein a creator estimates a trustability index for each of the identified notification mechanisms by combining data regarding availability of each of the discovered subscriber devices inventored by a discoverer, frequency and traffic volume for the identified notification mechanisms identified by an analyzer, and stores the trustability index in a contact database as the priority assigned to each of the identified notification mechanisms available for each of the discovered subscriber devices.

2. A computer system comprising a memory, a processor, and an interface of an internet service provider (ISP) network operator, the computer system being communicated with a subscriber local area network, the computer system further comprising:
   a contact database in the memory which stores a contact address of each subscriber device and identifications of notification mechanisms available for each subscriber device, and priorities and reliabilities of each notification mechanism;
   a query manager module verifying a contact address of a destination subscriber device and whether there are available notification mechanisms for the destination subscriber device in the contact database using an identity of the destination subscriber device, the query manager comprising sending means for sending a response indicating a state of a notification request to the interface of the ISP network operator;
   a detector module which comprises comprising:
      a discoverer for inventorying each subscriber device in the contact database by listening to the subscriber local area network,
      an analyzer for analyzing network traffic from the subscriber local area network and assigning a priority to each notification mechanism based on the analyzed network traffic,
      a creator for identifying notification mechanisms of each subscriber device inventored by the discoverer; and
   a notifier module selecting at least one notification mechanism from the available notification mechanisms when available notification mechanisms are identified by the creator and stored in the contact database for the destination subscriber device, and the notifier comprising sending means for sending a notification content to the contact address of the destination subscriber device using the selected notification mechanism;
   wherein the notifier module generates a notification message adapted respectively to each subscriber device; and
   wherein the creator estimates a trustability index for each notification mechanism by combining data regarding availability of each subscriber device inventored by the discoverer, frequency and traffic volume for each notification mechanism identified by the analyzer, and stores the trustability index in the contact database as the priority assigned to each notification mechanism available for each subscriber device.

3. The system according to claim 2, wherein the query manager distributes notification requests received from the interface of the ISP network operator and informs the notifier module about the contact address of the destination subscriber device and when the available notification mechanisms for the destination subscriber device are verified successfully in the contact database and, otherwise, when the verification is unsuccessful, asks the detector module for an active search of notification mechanisms and the destination subscriber device by analyzing network traffic from the subscriber local area network.

4. The computer system according to claim 2, wherein the computer system is integrated in the subscriber local area network.

5. The computer system according to claim 2, wherein the computer system is integrated in an ISP network using a virtualized broadband home gateway (vCPE).

6. The computer system according to claim 2, wherein the detector module identifies a type of each subscriber device and the notifier module generates a notification message for sending the notification content, the notification message using the selected notification mechanism which depends on a type of each subscriber device.

\* \* \* \* \*